United States Patent
Chaiken

(10) Patent No.: US 10,601,508 B2
(45) Date of Patent: Mar. 24, 2020

(54) SYSTEM AND METHOD OF COMMUNICATING ERRORS OF INFORMATION HANDLING SYSTEMS

(71) Applicant: Dell Products L.P., Round Rock, TX (US)

(72) Inventor: Craig Lawrence Chaiken, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/008,403

(22) Filed: Jun. 14, 2018

(65) Prior Publication Data

US 2019/0386742 A1  Dec. 19, 2019

(51) Int. Cl.
*H04B 10/116* (2013.01)
*H04J 14/08* (2006.01)
*H04B 10/077* (2013.01)

(52) U.S. Cl.
CPC ......... *H04B 10/116* (2013.01); *H04B 10/077* (2013.01); *H04J 14/08* (2013.01)

(58) Field of Classification Search
CPC ... H04B 10/07–0799; H04B 10/11–118; H04J 14/08
See application file for complete search history.

(56) References Cited

U.S. PATENT DOCUMENTS

| | | | | |
|---|---|---|---|---|
| 5,572,444 A | * | 11/1996 | Lentz | G06F 11/34 348/181 |
| 2006/0214815 A1 | * | 9/2006 | Komatsu | H04B 10/1143 340/956 |
| 2011/0090099 A1 | * | 4/2011 | Tsai | H04B 10/1143 341/100 |
| 2012/0328302 A1 | * | 12/2012 | Iizuka | H04B 10/1129 398/130 |
| 2014/0056172 A1 | * | 2/2014 | Lee | H04W 4/70 370/254 |
| 2016/0117908 A1 | * | 4/2016 | Ongyanco | H04B 10/116 340/641 |
| 2017/0012711 A1 | * | 1/2017 | Estes | H04B 10/541 |

* cited by examiner

*Primary Examiner* — Casey L Kretzer
(74) *Attorney, Agent, or Firm* — Baker Botts L.L.P.

(57) ABSTRACT

In one or more embodiments, one or more systems, methods, and/or processes may receive, via a light sensor, multiple light transmissions from an information handling system, the multiple light transmissions including multiple light sequences, where at least one light sequence of the multiple light sequences includes at least two different colors; may determine respective multiple colors of the multiple light transmissions; may determine the multiple color sequences from the multiple colors; may determine information represented by the multiple color sequences based at least on content and ordering of the multiple color sequences; and may provide the information to a service entity via a network.

14 Claims, 7 Drawing Sheets

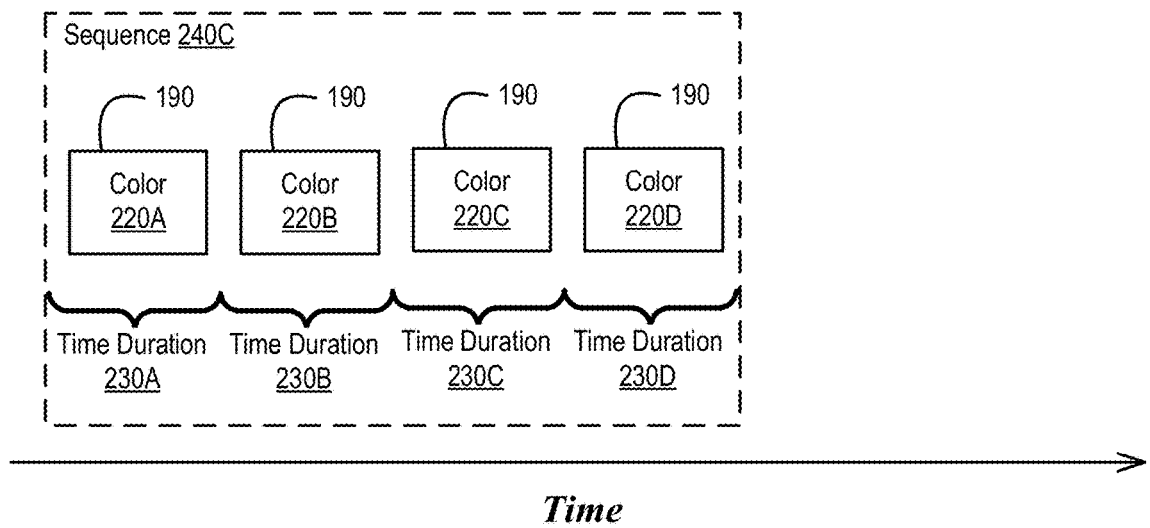
FIG. 2E
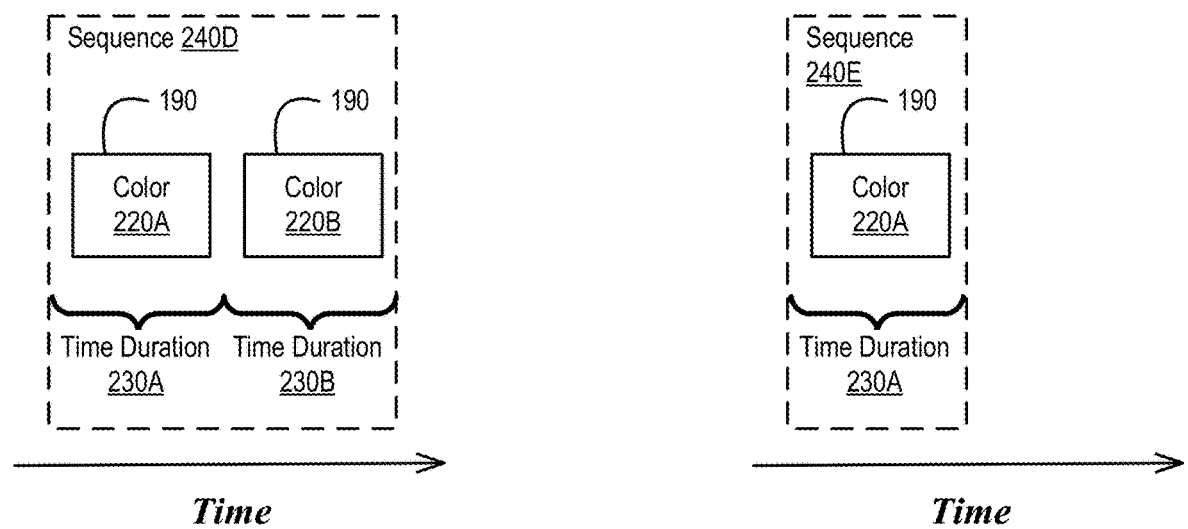
FIG. 2F  FIG. 2G

SYSTEM AND METHOD OF COMMUNICATING ERRORS OF INFORMATION HANDLING SYSTEMS

BACKGROUND

Field of the Disclosure

This disclosure relates generally to information handling systems and more particularly to communicating errors of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive, via a light sensor, multiple light transmissions from an information handling system, the multiple light transmissions including multiple light sequences, where at least one light sequence of the multiple light sequences includes at least two different colors; may determine respective multiple colors of the multiple light transmissions; may determine the multiple color sequences from the multiple colors; may determine information represented by the multiple color sequences based at least on content and ordering of the multiple color sequences; and may provide the information to a service entity via a network. In one or more embodiments, the network may include at least one of a public switched telephone network, an Internet, a wide area network, a cellular telephone network, and a satellite telephone network. In one or more embodiments, the light sensor includes an image sensor. For example, the image sensor may include a camera. In one or more embodiments, the one or more systems, methods, and/or processes may further determine a duration of time between a color of the multiple colors and another color of the multiple colors. For example, determining the multiple color sequences from the multiple colors may include determining an ending of a color sequence of the multiple color sequences and a beginning of another color sequence of the multiple color sequences based at least on the duration of time between the color of the multiple colors and the other color of the multiple colors. In one or more embodiments, the one or more systems, methods, and/or processes may further determine a beginning of each color sequence of the multiple sequences based at least on a color of the multiple colors. For example, determining the multiple color sequences from the multiple colors may include determining the multiple color sequences based at least on the color of the multiple colors.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 2C-2G illustrate examples of sequences of colors for time durations, according to one or more embodiments;

DETAILED DESCRIPTION

Figure 1A:
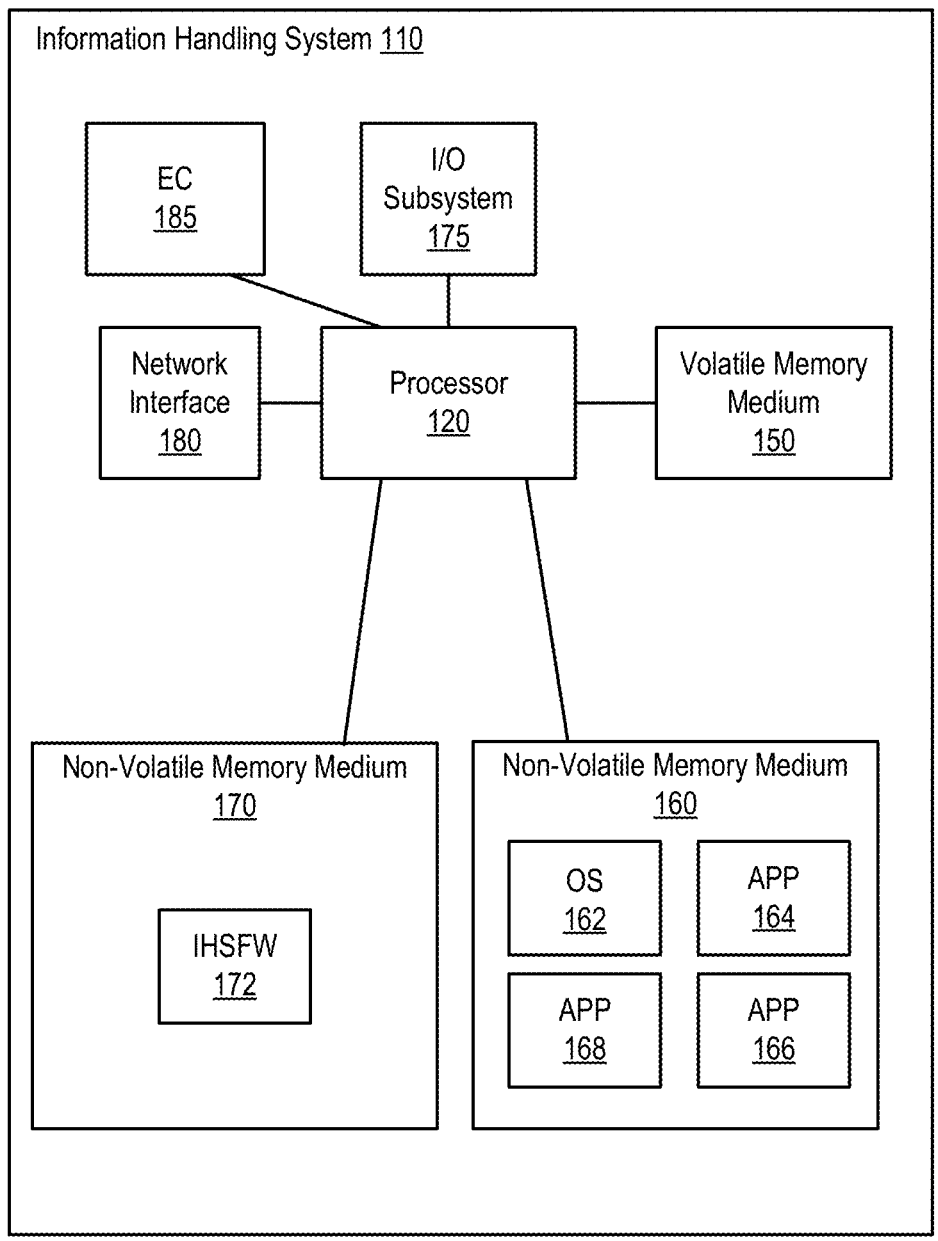
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more elements of an information handling system may fail prior to enabling textual and/or graphical video output. For example, if textual and/or graphical video output is not enabled, text and/or graphical information may not be displayed via a display coupled to or of the information handling system. In one or more embodiments, if textual and/or graphical video output is not enabled, information may be communicated via one or more optical indications. In one example, information may be communicated via one or more light emitting diodes (LEDs). In another example, information may be communicated via a display coupled to or of the information handling system. In one instance, the display may display a color. In a second instance, the display may display a sequence of colors. In a third instance, the display may display a color for a period of time. In another instance, the display may display a sequence of colors for respective periods of time. In one or more embodiments, if textual and/or graphical video output is not enabled, information may be communicated via one or more audio indications. For example, information may be communicated via one or more audio frequencies for respective one or more periods of time.

In one or more embodiments, a light emitting diode (LED) may produce less light as time transpires. For example, as a LED ages, the LED may produce less light. In one or more embodiments, if an LED produces less light, the LED may not be or include a reliable source of information if the information handling system has or develops one or more issues. In one instance, a user may incur one or more issues in deciphering information from a LED if the LED produces less light as time transpires. In another instance, a camera may incur one or more issues in deciphering information from a LED if the LED produces less light as time transpires.

In one or more embodiments, a display may include a built in self test (BIST). For example, an embedded controller of an information handling system may provide a signal to the display that initiates the BIST. In one or more embodiments, the BIST may display multiple colors. For example, the BIST may display multiple colors for durations of time. In one or more embodiments, if the embedded controller ceases providing the signal to the display, the display may be blanked and/or display a black color. In one or more embodiments, the BIST may display multiple colors in a sequence. For example, the BIST may display multiple colors for durations of time in a sequence. In one or more embodiments, the embedded controller may provide a signal to the display that initiates the BIST multiple times. For example, the embedded controller may convey information via providing a signal at multiple times to the display that initiates the BIST. For instance, multiple portions of a sequence may be displayed as the embedded controller provides the signal at multiple times.

In one or more embodiments, another information handling system may receive information from the display of or coupled to the information handling system. For example, a light sensor of or coupled to the other information handling system may receive the information from the display of or coupled to the information handling system. In one instance, the other information handling system may be or include a smart phone. In a second instance, the other information handling system may be or include a tablet computing device. In a third instance, the other information handling system may be or include a personal digital assistant. In a fourth instance, the other information handling system may be or include a laptop computer. In another instance, the other information handling system may be or include a desktop computer.

In one or more embodiments, an application executing on the other information handling system may acquire light transmissions of the display of the information handling system. For example, the light transmissions may be compared with one or more amounts of time. For instance, based at least on the light transmissions compared with the one or more amounts of time, the application may determine information from the embedded controller of the information handling system. In one or more embodiments, the information from the embedded controller of the information handling system may indicate one or more issues associated with the information handling system. In one or more embodiments, the information from the embedded controller of the information handling system may include text. For example, the information from the embedded controller of the information handling system may include one or more text messages.

In one or more embodiments, the application executing on the other information handling system may provide the information from the embedded controller of the information handling system to a service entity. In one or more embodiments, the application executing on the other information handling system may provide other information a service entity. For example, the other information may be based at least on the information from the embedded controller of the information handling system. In one or more embodiments, the application executing on the other information handling system may provide information to the service entity via a network. In one or more embodiments, the other information handling system may not provide a video to the service provider. For example, information determined by the application and provided to the service entity may be associated with a data size that may be less than a data size of a video of the display associated with the information handling system. In one instance, utilizing a data size that may be less than a data size of a video of the display associated with the information handling system may reduce network utilization. In another instance, utilizing a data size that may be less than a data size of a video of the display associated with the information handling system may reduce a bandwidth of the network.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and an embedded controller (EC) 185. As illustrated, volatile memory medium 150, non-volatile memory media 160 and 170, I/O subsystem 175, network interface 180, and EC 185 may be communicatively coupled to processor 120.

In one or more embodiments, one or more of volatile memory medium 150, non-volatile memory media 160 and 170, I/O subsystem 175, network interface 180, and EC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
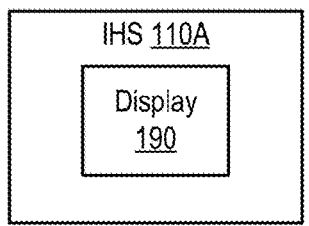
FIG. 1B illustrates an example of an information handling system that includes a display, according to one or more embodiments.
Figure 1C:
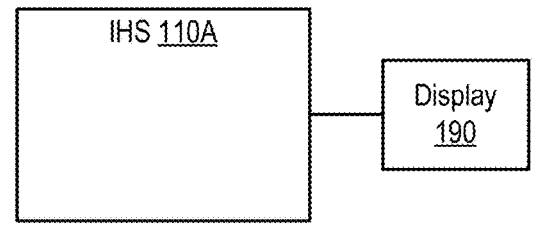
FIG. 1C illustrates an example of an information handling system that is coupled to a display, according to one or more embodiments.

Turning now to FIGS. 1B and 1C, examples of an information handling system and a display are illustrated, according to one or more embodiments. As shown in FIG. 1B, an IHS 110A may include a display 190. Although not specifically shown, EC 185 may be communicatively coupled to display 190, according to one or more embodiments. As illustrated in FIG. 1C, IHS 110A may be coupled to display 190. Although not specifically shown, EC 185 may be communicatively coupled to display 190, according to one or more embodiments.

Figure 1D:
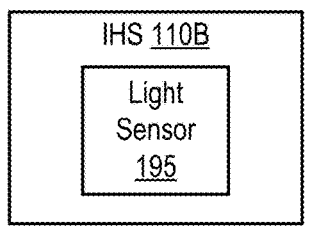
FIG. 1D illustrates an example of an information handling system that includes a light sensor, according to one or more embodiments.
Figure 1E:
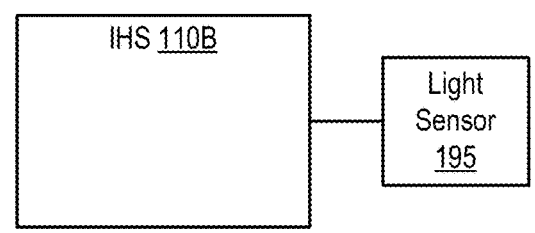
FIG. 1E illustrates an example of an information handling system that is coupled to a light sensor, according to one or more embodiments.

Turning now to FIGS. 1D and 1E, examples of an information handling system and a light sensor are illustrated, according to one or more embodiments. As shown in FIG. 1D, an IHS 110B may include a light sensor 195. Although not specifically shown, processor 120 may be communicatively coupled to light sensor 195, according to one or more embodiments. As shown in FIG. 1E, IHS 110B may be coupled to light sensor 195. Although not specifically shown, processor 120 may be communicatively coupled to light sensor 195, according to one or more embodiments.

Figure 2A:
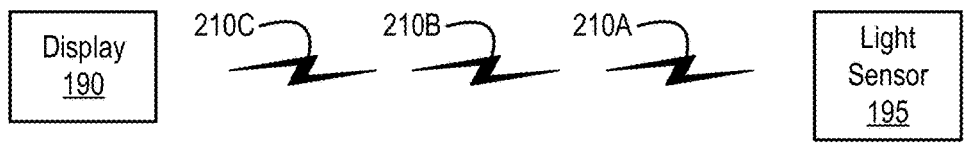
FIGS. 2A and 2B illustrate examples of a display, light transmissions, and a light sensor, according to one or more embodiments.
Figure 2B:
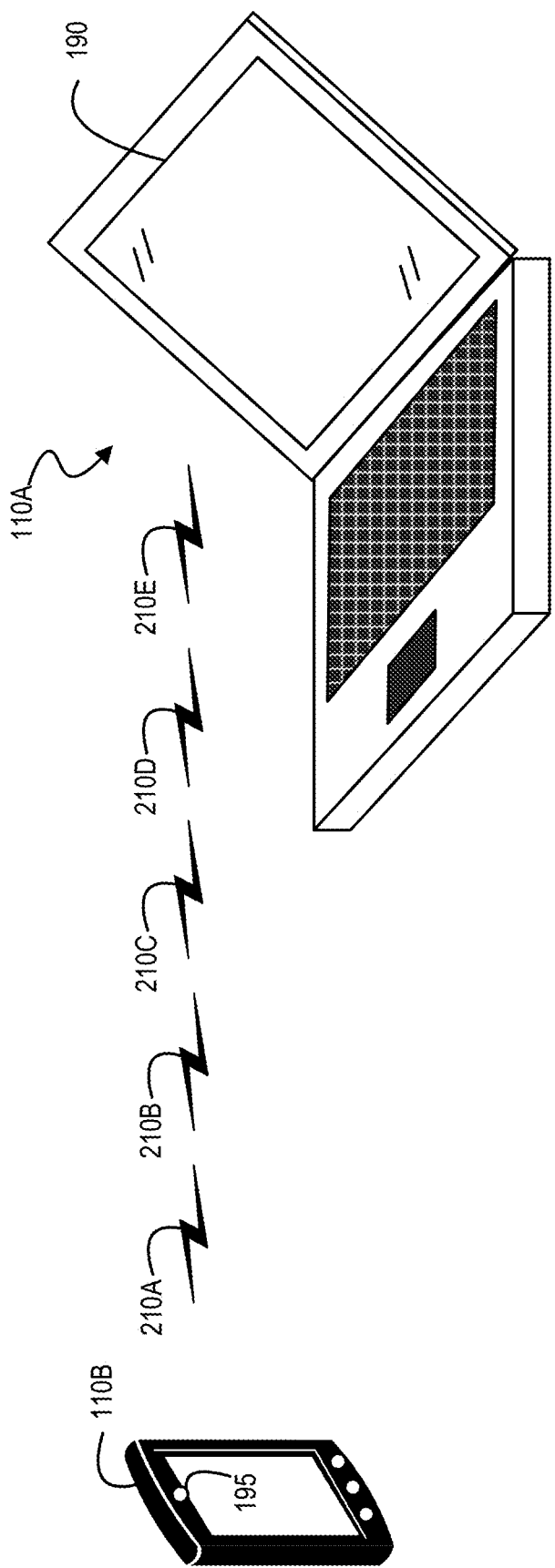

Turning now to FIGS. 2A and 2B, examples of a display, light transmissions, and a light sensor are illustrated, according to one or more embodiments. As shown in FIG. 2A, display 190 may provide light transmissions 210A-210C. In one or more embodiments, light sensor 195 may receive light transmissions 210A-210C or receive at least a portion of light transmissions 210A-210C. In one or more embodiments, light transmissions 210A-210C may be provided at multiple times. In one or more embodiments, light transmissions 210A-210C may be associated with multiple colors. In one or more embodiments, light transmissions 210A-210C may be associated with multiple durations of time. In one or more embodiments, a BIST of display 190 may cause display 190 provide light transmissions 210A-210C. For example, EC 185 may provide a signal to display 190 that initiates the BIST. As illustrated in FIG. 2B, display 190 of IHS 110A may provide light transmissions 210A-210E. In one or more embodiments, light sensor 195 of IHS 110B may receive at least portions of light transmissions 210A-210E. For example, light sensor 195 of IHS 110B may receive at least a portion of each of light transmissions 210A-210E. In one or more embodiments, light sensor 195 may be or include an image sensor. In one or more embodiments, light sensor 195 may be or include a camera.

Figure 2C:
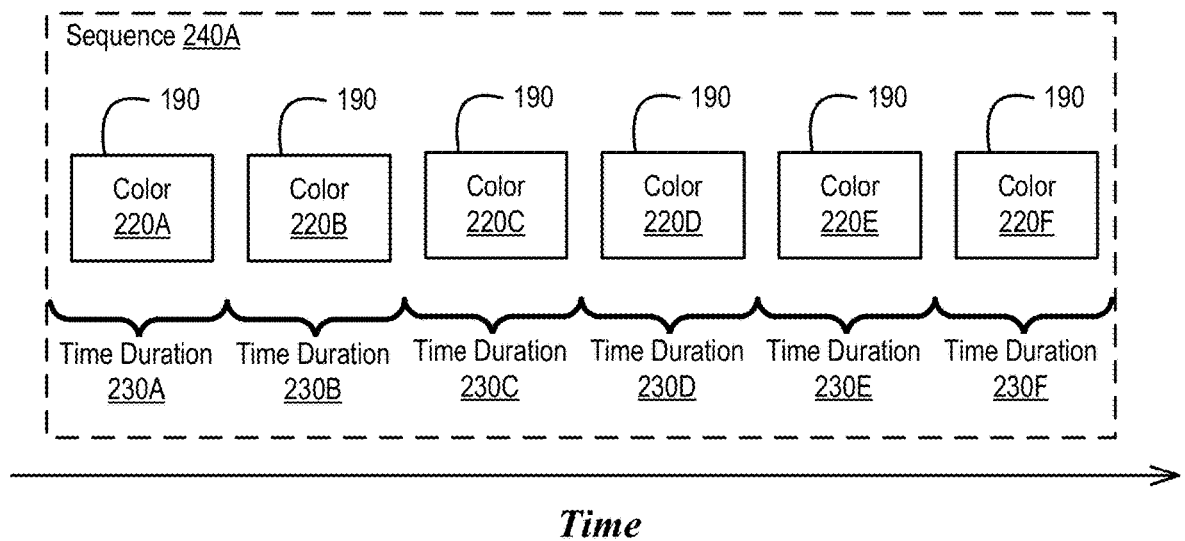
Figure 2D:
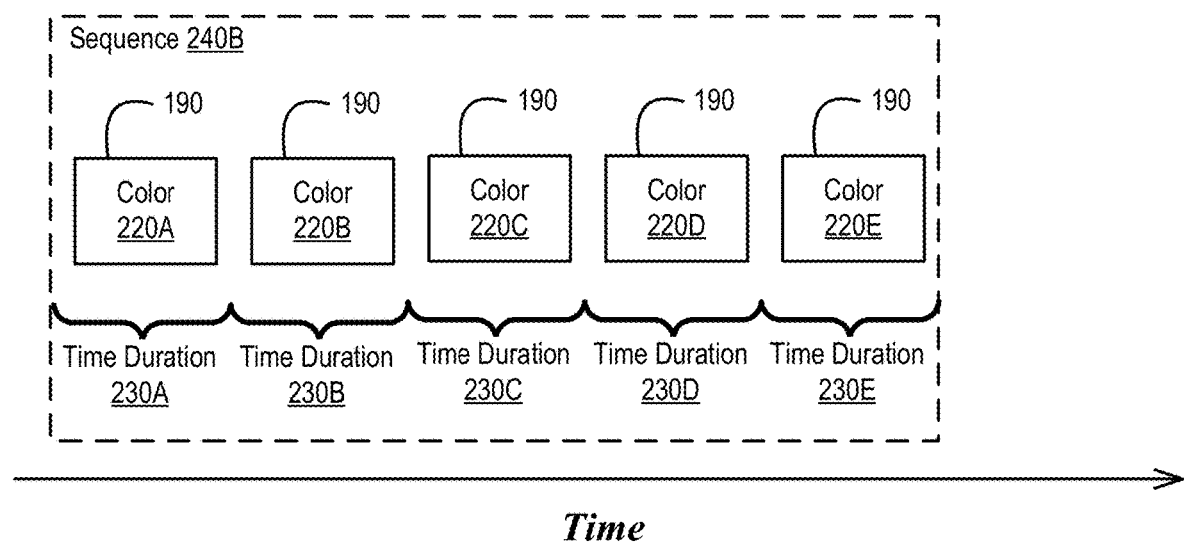

Turning now to FIGS. 2C-2G, examples of sequences of colors for time durations are illustrated, according to one or more embodiments. As shown in FIG. 2C, display 190 may display colors 220A-220F for respective time durations 230A-230F. In one or more embodiments, a sequence 240A may include colors 220A-220F for respective time durations 230A-230F. As illustrated in FIG. 2D, display 190 may display colors 220A-220E for respective time durations 230A-230E. In one or more embodiments, a sequence 240B may include colors 220A-220E. For example, sequence 240B may include colors 220A-220E for respective time durations 230A-30E. As shown in FIG. 2E, display 190 may display colors 220A-220D for respective time durations 230A-230D. In one or more embodiments, a sequence 240C may include colors 220A-220D. For example, sequence 240C may include colors 220A-220D for respective time durations 230A-230D. As illustrated in FIG. 2F, display 190 may display colors 220A and 220B for respective time durations 230A and 230B. In one or more embodiments, a sequence 240D may include colors 220A and 220B. For example, sequence 240D may include colors 220A and 220B for respective time durations 230A and 230B. As shown in FIG. 2G, display 190 may display color 220A for time duration 230A. In one or more embodiments, a sequence 240D may include color 220A. For example, sequence 240D may include color 220A for time duration 230A. In one or more embodiments, two or more of sequences 240A-240D may be combined. For example, two or more of sequences 240A-240D may be combined to convey information. In one or more embodiments, display 190 may be blanked between displaying two or more of colors 220A-220F. For example, display 190 may be blanked for a duration of time between displaying two or more of colors 220A-220F. In one or more embodiments, display 190 may not be blanked between two or more of colors 220A-220F. In one or more embodiments, display 190 may be blanked for a duration of time between displaying two or more sequences of colors. In one or more embodiments, display 190 may not be blanked for a duration of time between displaying two or more sequences of colors.

Figure 3:
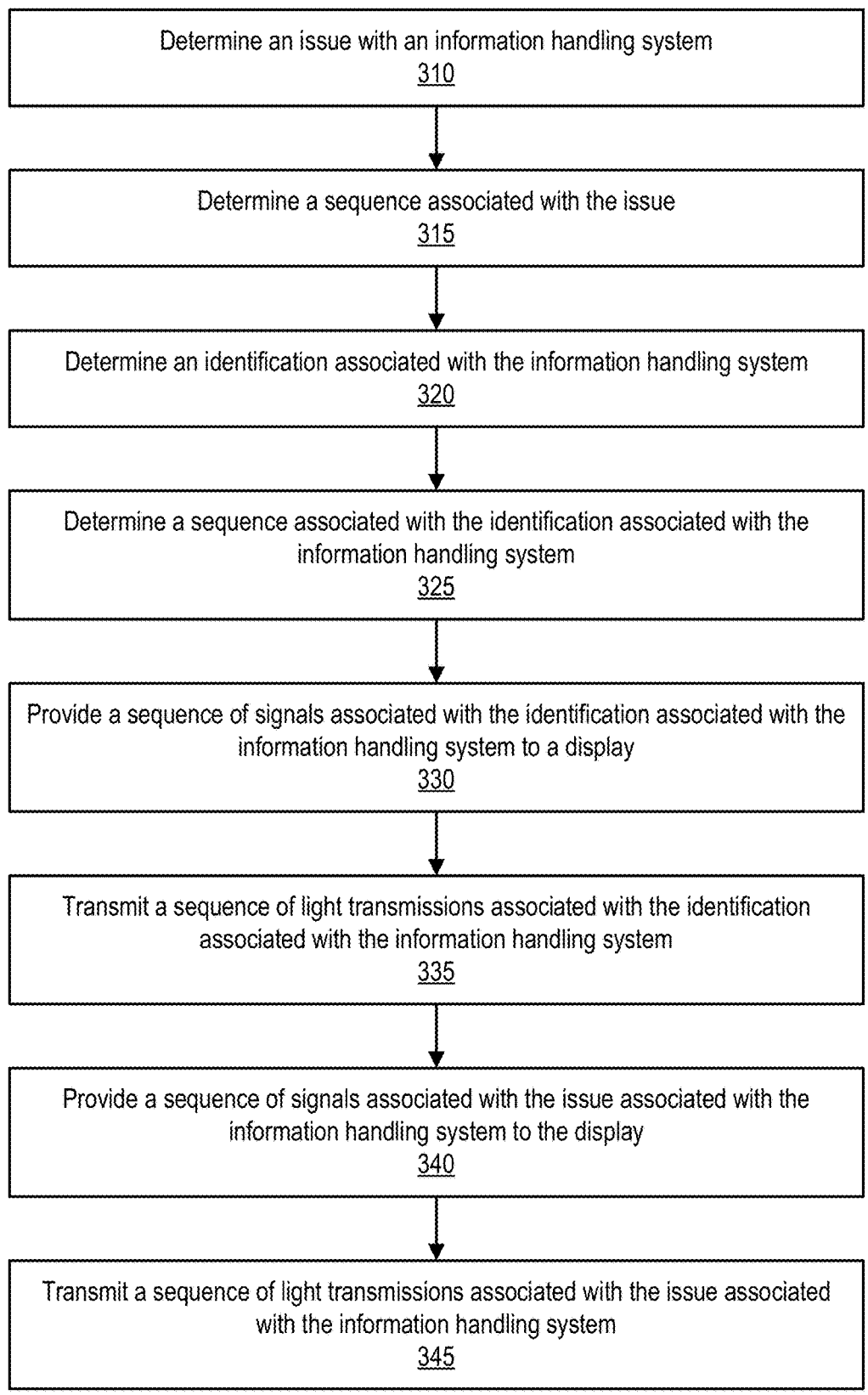
FIG. 3 illustrates an example of a method of communicating information, according to one or more embodiments.

Turning now to FIG. 3, an example of a method of communicating information is illustrated, according to one or more embodiments. At 310, an issue associated with an information handling system may be determined. For example, EC 185 may determine an issue with IHS 110. At 315, a sequence associated with the issue may be determined. For example, EC 185 may determine a sequence associated with the issue. In one or more embodiments, a sequence associated with the issue may be or include a sequence of signals. For example, the sequence of signals may be or include a sequence of signals to be applied to display 190. For example, the sequence of signals to be applied to display 190 may initiate and/or cease a BIST of display 190.

In one or more embodiments, a BIST of display 190 may include multiple light transmissions. In one example, each of one or more of the multiple light transmissions may be associated with a color. For instance, each of one or more of the multiple light transmissions may be associated with a color that is different from another color of another light transmission. In another example, each of one or more of the multiple light transmissions may be associated with a duration of time. In one instance, each of one or more of the multiple light transmissions may be associated with a duration of time that is different from another duration of time of another light transmission. In another instance, each of one or more of the multiple light transmissions may be associated with a duration of time that is the same as another duration of time of another light transmission.

At 320, an identification associated with the information handling system may be determined. For example, EC 185 may determine an identification associated with IHS 110. For instance, the identification associated with the information handling system may include one or more of a user identification, a hash value, a service tag identification, a media access control (MAC) address, a processor identification, a make of the information handling system, a model of the information handling system, a globally unique identifier (GUID), and an universally unique identifier (UUID), among others.

At 325, a sequence associated with the identification associated with the information handling system may be determined. For example, EC 185 may determine a sequence associated with the identification associated with IHS 110. In one or more embodiments, a sequence associated with the identification may be or include a sequence of signals. For example, the sequence of signals may be or include a sequence of signals to be applied to display 190. For example, the sequence of signals to be applied to display 190 may initiate and/or cease a BIST of display 190. At 330, a sequence of signals associated with the identification associated with the information handling system may be provided to the display. For example, EC 185 may provide a sequence of signals associated with the identification associated with IHS 110.

At 335, a sequence of light transmissions associated with the identification associated with the information handling system may be transmitted. For example, display 190 may transmit a sequence of light transmissions associated with the identification associated with IHS 110. In one or more embodiments, a sequence of light transmissions associated with the identification associated with the information handling system may be based at least on the sequence associated with the identification associated with the information handling system, determined at 325. For example, the sequence of light transmissions associated with the identification associated with the information handling system may include one or more light transmissions of the BIST. In one instance, a first portion of the sequence of light transmissions associated with the identification may be based at least on a first amount of time that the BIST is utilized. In another instance, a second portion of the sequence of light transmissions associated with the identification may be based at least on a second amount of time, the same as or different from the first amount of time, that the BIST is utilized. In one or more embodiments, the sequence of light transmissions associated with the identification associated with the information handling system may include one or more of sequences 240A-240E, among others.

At 340, a sequence of signals associated with the issue associated with the information handling system may be provided to the display. For example, EC 185 may provide a sequence of signals associated with the issue associated with IHS 110. At 345, a sequence of light transmissions associated with the issue associated with the information handling system may be transmitted. For example, display 190 may transmit a sequence of light transmissions associated with the issue associated with IHS 110. In one or more embodiments, a sequence of light transmissions associated with the issue associated with the information handling system may be based at least on the sequence associated with the issue associated with the information handling system, determined at 315. For example, the sequence of light transmissions associated with the issue associated with the information handling system may include one or more light transmissions of the BIST. In one instance, a first portion of the sequence of light transmissions associated with the issue may be based at least on a first amount of time that the BIST is utilized. In another instance, a second portion of the sequence of light transmissions associated with the issue may be based at least on a second amount of time, the same as or different from the first amount of time, that the BIST is utilized. In one or more embodiments, the sequence of light transmissions associated with the issue associated with the information handling system may include one or more of sequences 240A-240E, among others.

In one or more embodiments, a sequence of light transmissions associated with information may include transmitting light as a value of one. In one example, transmitting light as a value of one may include transmitting light for a period of time. In another example, transmitting light as a value of one may include transmitting light associated with a first color. For instance, the first color may be or include orange. In one or more embodiments, a sequence of light transmissions associated with information may include not transmitting light as a value of zero. For example, not transmitting light as a value of zero may include not transmitting light for a period of time. In one or more embodiments, transmitting light as a value of zero may include transmitting light associated with a second color, different from the first color. For example, the second color may be or include white.

Figure 4:
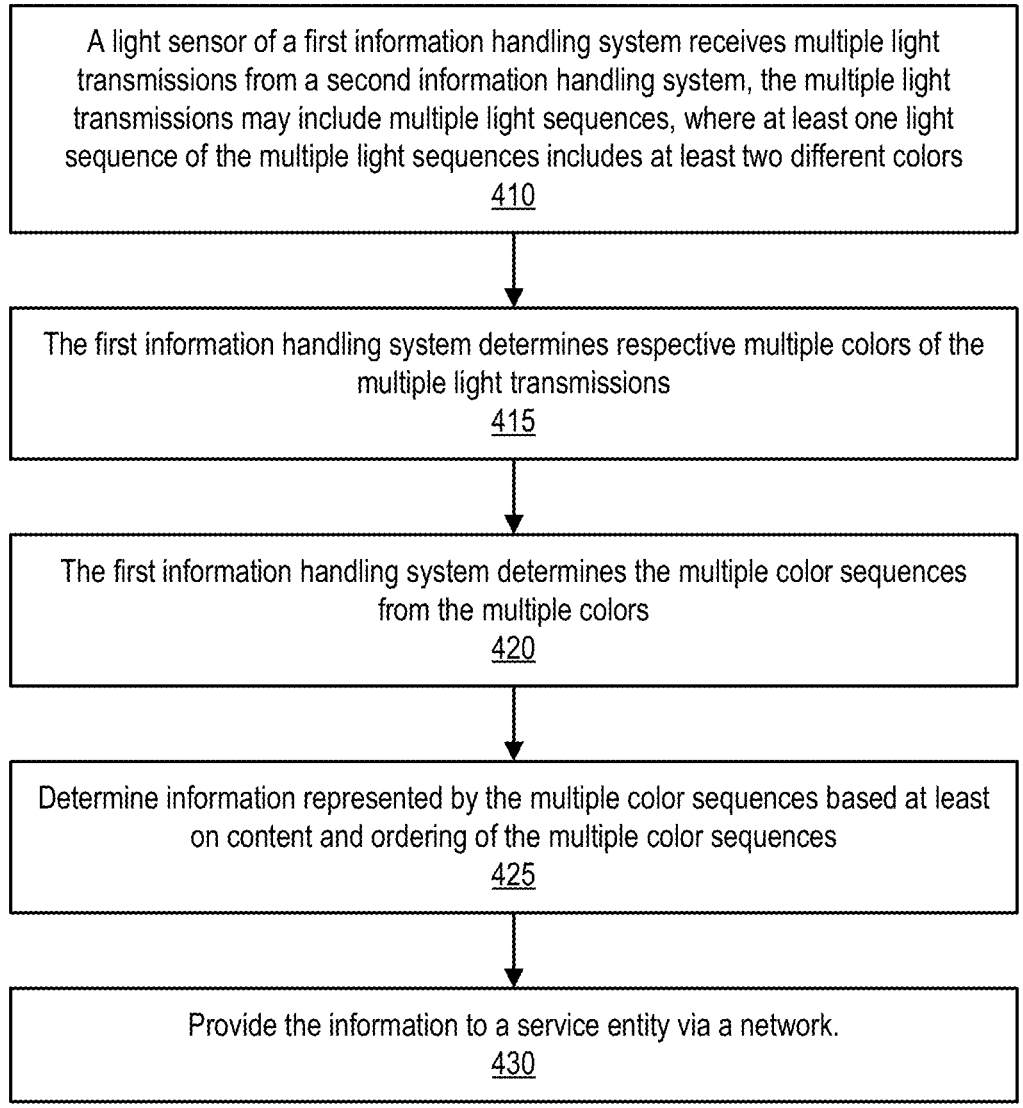
FIG. 4 illustrates another example of a method of communicating information, according to one or more embodiments.

Turning now to FIG. 4, another example of a method of communicating information is illustrated, according to one or more embodiments. At 410, a light sensor of a first information handling system may receive multiple light transmissions from a second information handling system, the multiple light transmissions may include multiple light sequences, where at least one light sequence of the multiple light sequences includes at least two different colors. For example, light sensor 195 of IHS 110B may receive multiple light transmissions 210 from IHS 110A. For instance, multiple light transmissions 210 may include multiple light sequences. In one or more embodiments, at least one light sequence of the multiple light sequences includes at least two different colors. For example, the at least one light sequence may include a first color 220 and a second color 220. For instance, the first color 220 may be different from the second color 220. At 415, the first information handling system may determine respective multiple colors of the multiple light transmissions. For example, IHS 110B may determine respective multiple colors of the multiple light transmissions 210.

At 420, the first information handling system may determine the multiple color sequences from the multiple colors. For example, IHS 110B may determine the multiple color sequences from the multiple colors. For instance, the multiple color sequences may include multiple of sequences 240. In one or more embodiments, the first information handling system may determine a duration of time between a color of the multiple and another color of the multiple colors. For example, determining the multiple color sequences from the multiple colors may include determining an ending of a color sequence of the multiple color sequences and a beginning of another color sequence of the multiple color sequences based at least on the duration of time between the color of the multiple colors and the other color of the multiple colors. In one instance, a duration of time between color 220A of sequence 240E and color 220A of sequence 240C may separate sequences 240E and 240C. In another instance, a duration of time between color 220B of sequence 240D and color 220A of sequence 240B may separate sequences 240D and 240B. In one or more embodiments, the first information handling system may determine a beginning of each color sequence of the multiple sequences based at least on a color of the multiple colors. For example, determining the multiple color sequences from the multiple colors may include determining the multiple color sequences based at least on the color of the multiple colors. For instance, color 220A may be utilized in determining a beginning of each color sequence of the multiple sequences.

At 425, information represented by the multiple color sequences may be determined based at least on content and ordering of the multiple color sequences. For example, IHS 110B may determine information represented by the multiple color sequences based at least on content and ordering of the multiple color sequences. In one instance, a first sequence 240 may represent a first portion of the information. In another instance, a second sequence 240, different from the first sequence 240, may represent a second portion of the information. In one or more embodiments, the information may include text information. In one or more embodiments, the information may include binary data. In one or more embodiments, the information may include an identification associated with the second information handling system. For example, the identification associated with the second information handling system may include one or more of a user identification, a hash value, a service tag identification, a MAC address, a processor identification, a make of the second information handling system, a model of the second information handling system, a GUID, and an UUID, among others. In one or more embodiments, the information may include information associated with one or more issues of the second information handling system. For example, the information may indicate the one or more issues of the second information handling system.

At 430, the information may be provided to a service entity via a network. For example, IHS 110B may provide the information to a service entity via a network. In one or more embodiments, the network may include one or more of a public switched telephone network, an Internet, a wide area network, a wireless network, a cellular telephone network, and a satellite telephone network, among others. In one or more embodiments, the service entity may provide one or more replacement elements for the second information handling system. For example, the service entity may ship one or more replacement elements for the second information handling system. In one or more embodiments, the service entity may dispatch and/or provide a service technician to address the one or more issues associated with the second information handling system. For example, the service technician may repair and/or replace the second information handling system.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A first information handling system, comprising:
   at least one processor;
   a light sensor, coupled to the at least one processor; and
   a memory medium, coupled to the at least one processor, that stores instructions executable by the at least one processor, which when executed by the at least one processor, cause the first information handling system to:
   receive, via the light sensor, a plurality of light transmissions from a second information handling system, the plurality of light transmissions including a plurality of light sequences, the plurality of light sequences associated with a built in self test (BIST) of the second information handling system;
   determine a respective plurality of colors of the plurality of light transmissions;
   determine a plurality of color sequences from the plurality of colors;
   determine a respective time duration for each color of the plurality of colors from each color sequence of the plurality of color sequences;

determine an issue associated with the second information handling system represented by the plurality of color sequences based at least on the respective time duration for each color of the plurality of colors from each color sequence of the plurality of color sequences and an ordering of the plurality of color sequences; and provide the determined issue to a service entity via a network.

2. The first information handling system of claim 1, wherein the network includes at least one of a public switched telephone network, an Internet, a wide area network, a cellular telephone network, and a satellite telephone network.

3. The first information handling system of claim 1, wherein the first information handling system includes at least one of a smart phone, a personal digital assistant, and a tablet computing device; and wherein the light sensor includes an image sensor.

4. The first information handling system of claim 1, wherein the instructions further cause the first information handling system to:

determine a duration of time between a color of the plurality of colors and another color of the plurality of colors; and wherein, to determine the plurality of color sequences from the plurality of colors, the instructions further cause the first information handling system to determine an ending of a color sequence of the plurality of color sequences and a beginning of another color sequence of the plurality of color sequences based at least on the duration of time between the color of the plurality of colors and the other color of the plurality of colors.

5. The first information handling system of claim 1, wherein the instructions further cause the first information handling system to:

determine a beginning of each color sequence of the plurality of sequences based at least on a color of the plurality of colors; and wherein, to determine the plurality of color sequences from the plurality of colors, the instructions further cause the first information handling system to determine the plurality of color sequences based at least on the color of the plurality of colors.

6. A method, comprising:

a light sensor of a first information handling system receiving a plurality of light transmissions from a second information handling system, the plurality of light transmissions including a plurality of light sequences, the plurality of light sequences associated with a built in self test (BIST) of the second information handling system;

the first information handling system determining a respective plurality of colors of the plurality of light transmissions;

the first information handling system determining a plurality of color sequences from the plurality of colors;

the first information handling system determining a respective time duration for each color of the plurality of colors from each color sequence of the plurality of color sequences;

determining an issue associated with the second information handling system represented by the plurality of color sequences based at least on the respective time duration for each color of the plurality of colors from each color sequence of the plurality of color sequences and an ordering of the plurality of color sequences; and providing the determined issue to a service entity via a network.

7. The method of claim 6, wherein the network includes at least one of a public switched telephone network, an Internet, a wide area network, a cellular telephone network, and a satellite telephone network.

8. The method of claim 6, wherein the first information handling system includes at least one of a smart phone, a personal digital assistant, and a tablet computing device; and wherein the light sensor includes an image sensor of the first information handling system.

9. The method of claim 6, further comprising:

the first information handling system determining a duration of time between a color of the plurality of colors and another color of the plurality of colors;

wherein the first information handling system determining the plurality of color sequences from the plurality of colors includes the first information handling system determining an ending of a color sequence of the plurality of color sequences and a beginning of another color sequence of the plurality of color sequences based at least on the duration of time between the color of the plurality of colors and the other color of the plurality of colors.

10. The method of claim 6, further comprising:

the first information handling system determining a beginning of each color sequence of the plurality of sequences based at least on a color of the plurality of colors;

wherein the first information handling system determining the plurality of color sequences from the plurality of colors includes the first information handling system determining the plurality of color sequences based at least on the color of the plurality of colors.

11. A computer-readable non-transitory memory medium that includes instructions that, when executed by at least one processor of a first information handling system, cause the first information handling system to:

receive, via a light sensor of the first information handling system, a plurality of light transmissions from a second information handling system, the plurality of light transmissions including a plurality of light sequences, the plurality of light sequences associated with a built in self test (BIST) of the second information handling system;

determine a respective plurality of colors of the plurality of light transmissions;

determine a plurality of color sequences from the plurality of colors;

determine a respective time duration for each color of the plurality of colors from each color sequence of the plurality of color sequences;

determine an issue associated with the second information handling system represented by the plurality of color sequences based at least on the respective time duration for each color of the plurality of colors from each color sequence of the plurality of color sequences and an ordering of the plurality of color sequences; and provide the determined issue to a service entity via a network.

12. The computer-readable non-transitory memory medium of claim 11, wherein the network includes at least one of a public switched telephone network, an Internet, a wide area network, a cellular telephone network, and a satellite telephone network.

13. The computer-readable non-transitory memory medium of claim 11,
- wherein the instructions further cause the first information handling system to:
  - determine a duration of time between a color of the plurality of colors and another color of the plurality of colors; and
- wherein, to determine the plurality of color sequences from the plurality of colors, the instructions further cause the first information handling system to determine an ending of a color sequence of the plurality of color sequences and a beginning of another color sequence of the plurality of color sequences based at least on the duration of time between the color of the plurality of colors and the other color of the plurality of colors.

14. The computer-readable non-transitory memory medium of claim 11,
- wherein the instructions further cause the first information handling system to:
  - determine a beginning of each color sequence of the plurality of sequences based at least on a color of the plurality of colors; and
- wherein, to determine the plurality of color sequences from the plurality of colors, the instructions further cause the first information handling system to determine the plurality of color sequences based at least on the color of the plurality of colors.

\* \* \* \* \*